Figure 3:
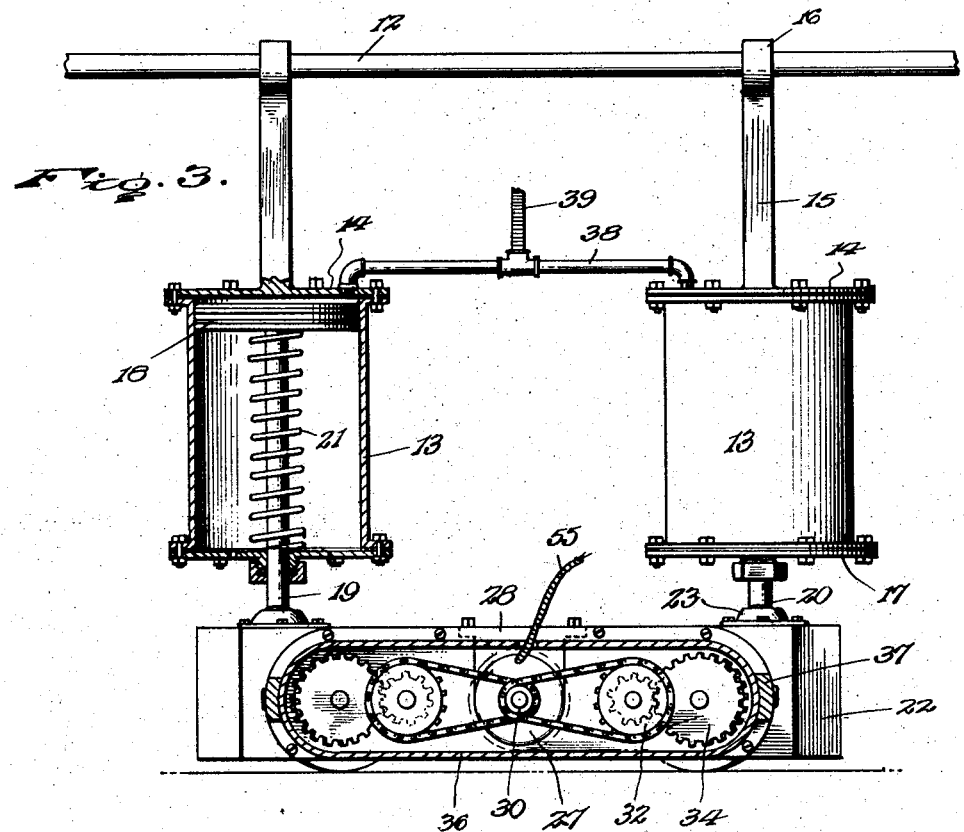

Nov. 10, 1925.                                              1,560,665
                      H. H. COLLINS
          AUXILIARY TURNING DEVICE FOR MOTOR VEHICLES
                  Filed June 20, 1923           4 Sheets-Sheet 1
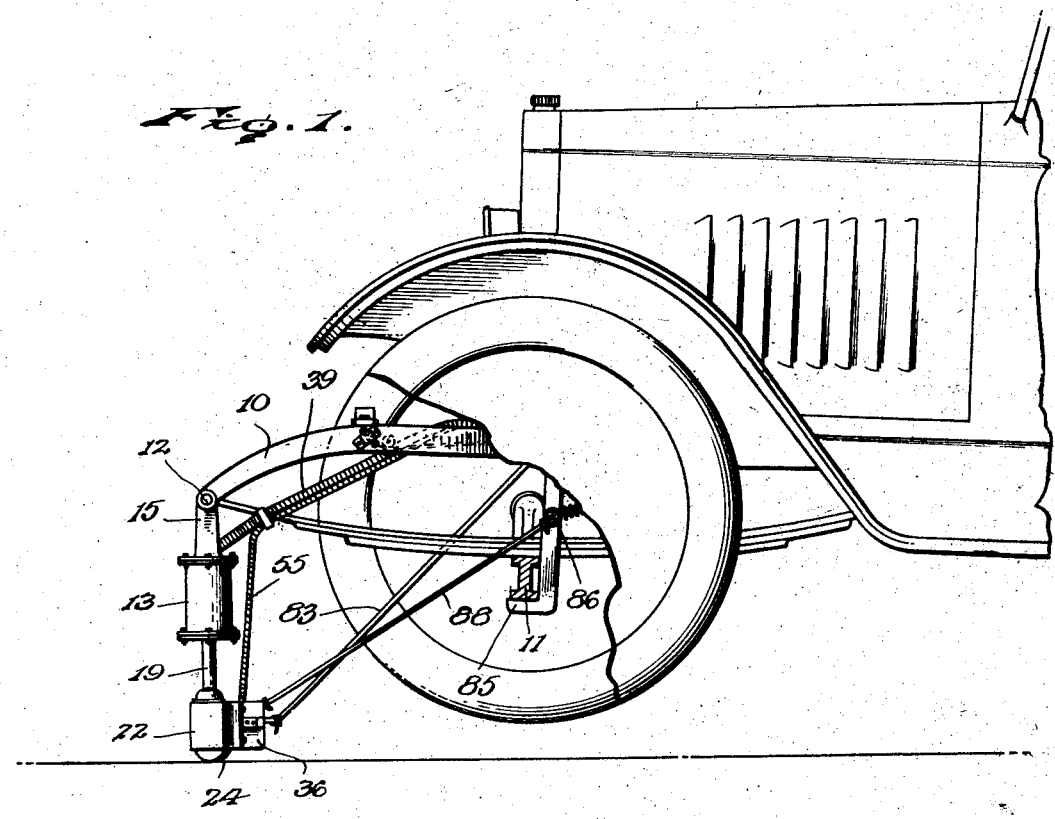
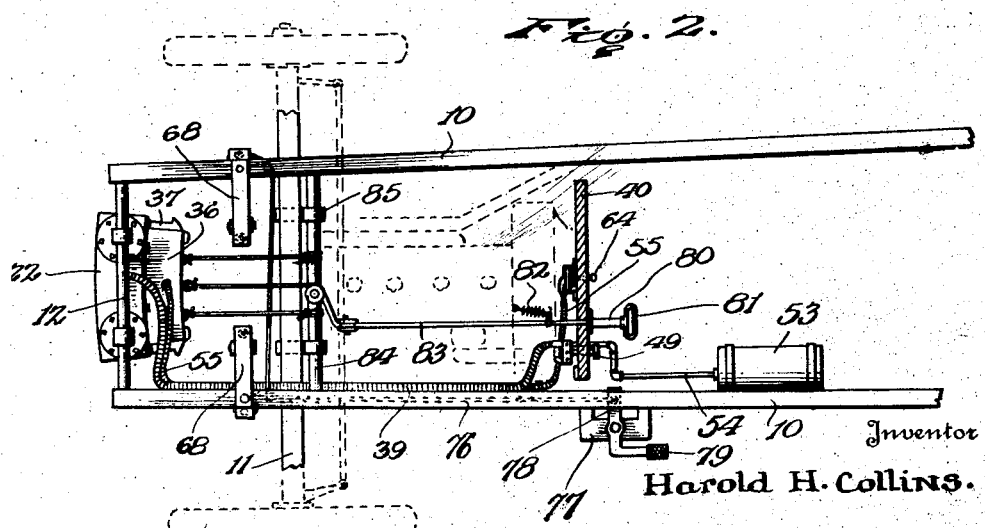
Inventor
Harold H. Collins.
By
*Larry Lacey*, Attorney Nov. 10, 1925.

H. H. COLLINS 1,560,665

AUXILIARY TURNING DEVICE FOR MOTOR VEHICLES

Filed June 20, 1923 4 Sheets-Sheet 2

Inventor

Harold H. Collins.

Nov. 10, 1925.

H. H. COLLINS

AUXILIARY TURNING DEVICE FOR MOTOR VEHICLES

Filed June 20, 1923    4 Sheets-Sheet 3

1,560,665

Inventor
Harold H. Collins.

By Lacey Lacey, Attorney

Nov. 10, 1925.
1,560,665
H. H. COLLINS
AUXILIARY TURNING DEVICE FOR MOTOR VEHICLES
Filed June 20, 1923    4 Sheets-Sheet 4
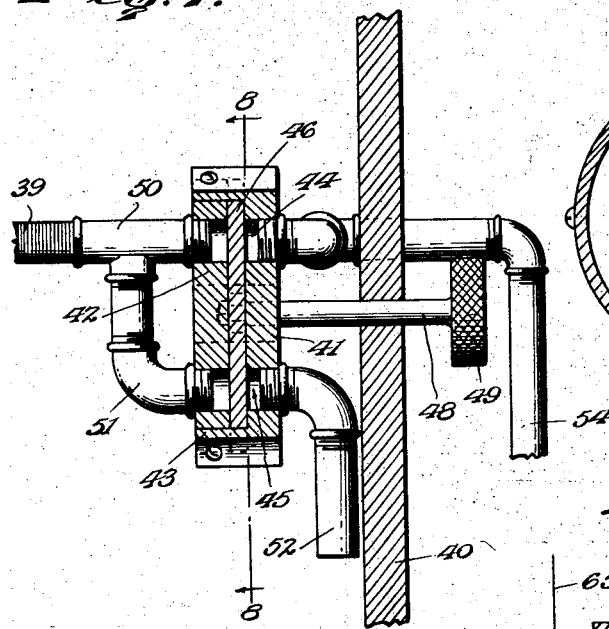
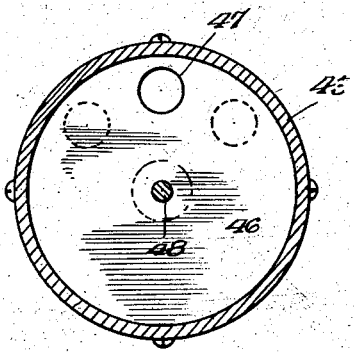
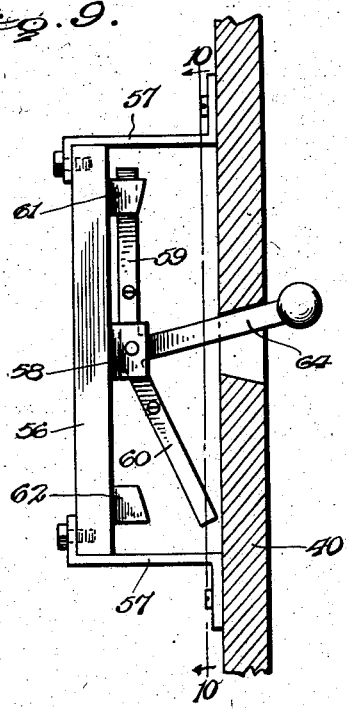
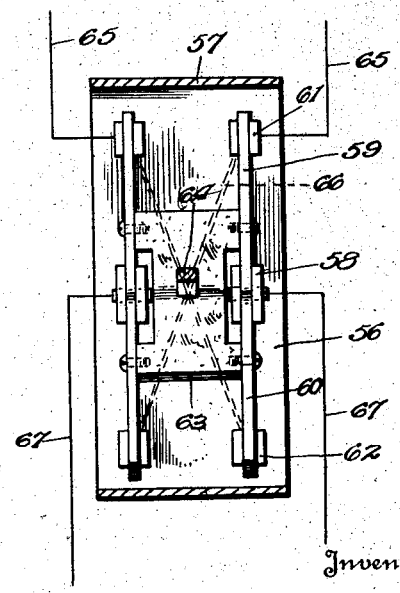
Inventor
Harold H. Collins.
By
Lacey & Lacey, Attorneys Patented Nov. 10, 1925.

1,560,665

UNITED STATES PATENT OFFICE.

HAROLD H. COLLINS, OF CINCINNATI, OHIO.

AUXILIARY TURNING DEVICE FOR MOTOR VEHICLES.

Application filed June 20, 1923. Serial No. 646,709.

*To all whom it may concern:*

Be it known that I, HAROLD H. COLLINS, citizen of the United States, residing at Mount Auburn, Cincinnati, in the county of Hamilton and State of Ohio, have invented certain new and useful Improvements in Auxiliary Turning Devices for Motor Vehicles, of which the following is a specification.

This invention relates to an improved auxiliary turning device for motor vehicles and seeks, as one of its principal objects, to provide a device of this character whereby, when a vehicle is parked near a curbing, for instance, closely between two other automobiles, the front wheels of the vehicle may be elevated and then swung outwardly in an arc away from the curbing so that the driver may proceed without the necessity for maneuvering the vehicle backwardly and forwardly, as is usually required under such circumstances.

The invention has as a further object to provide a device which may be controlled and operated from the driver's seat of the vehicle.

And the invention has as a still further object to provide a device which, after use, may be swung upwardly beneath the vehicle to a position out of the way.

Other and incidental objects will appear hereinafter.

Figure 4:
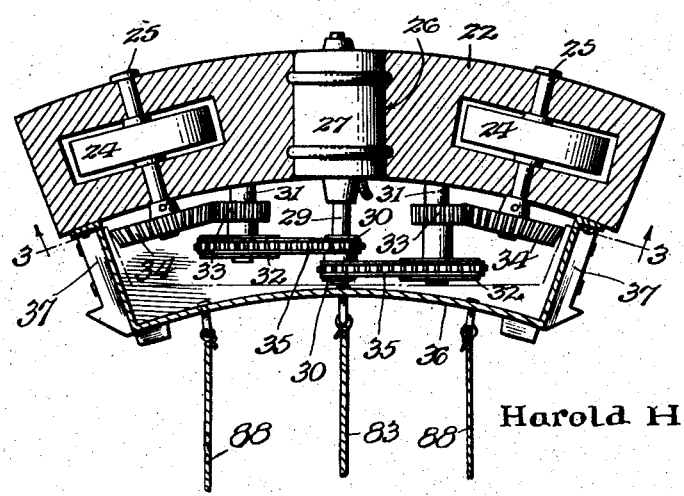

In the drawings:

Figure 1 is a fragmentary side elevation showing my improved device applied to a motor vehicle, parts being broken away and illustrated in section, Figure 2 is a fragmentary plan view, Figure 3 is an enlarged detail sectional view on the line 3—3 of Figure 4, looking in the direction of the arrows.

Figure 5:
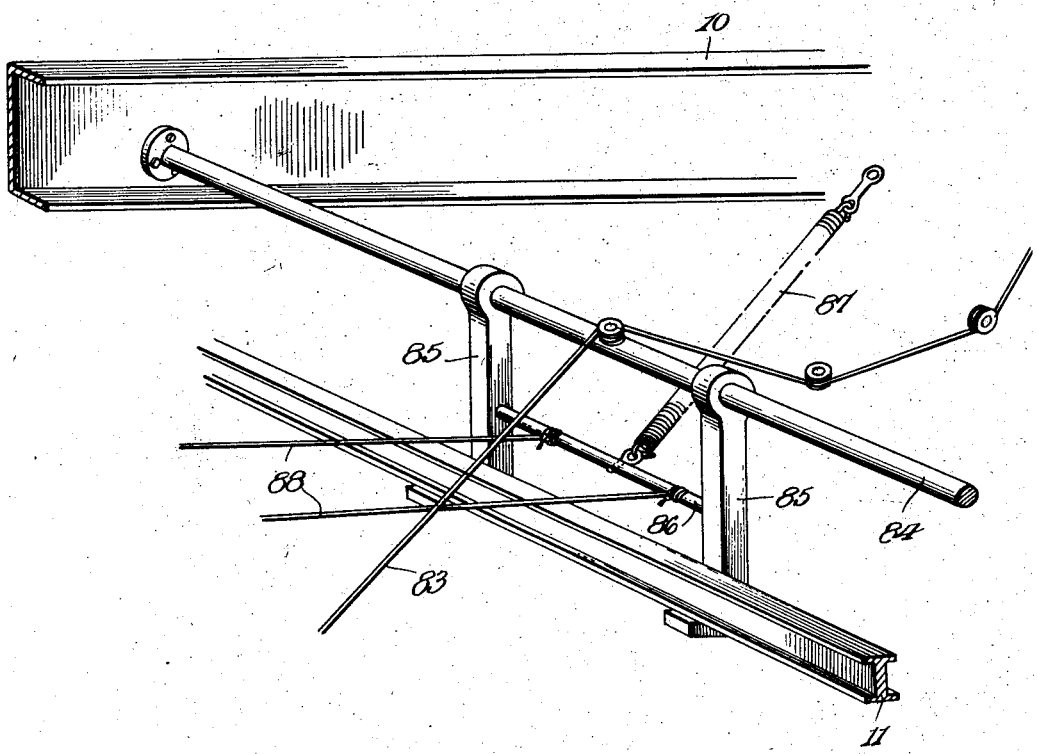
Figure 6:
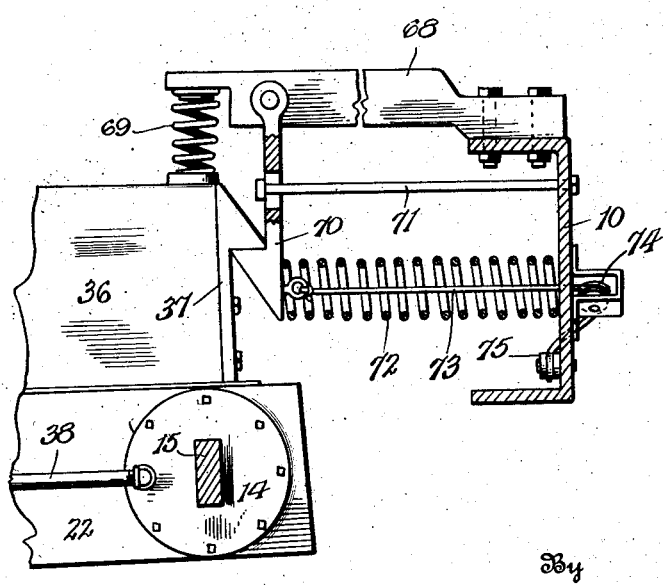

Figure 4 is a horizontal sectional view through the bearing block of the device, Figure 5 is a detail perspective view showing the latch mechanism employed for connecting the chassis frame of the vehicle with the front axle thereof, Figure 6 is a detail sectional view showing the latch mechanism for holding the bearing block of the device inactive, Figure 7 is a detail vertical sectional view through the control valve for the lifting cylinders employed, Figure 8 is a detail sectional view on the line 8—8 of Figure 7, looking in the direction of the arrows, Figure 9 is a side elevation showing the control switch for the motor of the device, and Figure 10 is a plan view of the switch.

Referring now more particularly to the drawings, I have, for convenience, shown my improved device in connection with a motor vehicle, the spaced side bars of the chassis frame of which are indicated at 10 while the front axle of the vehicle is indicated at 11. In connection with the side bars 10, I employ a cross bar 12 which is arranged to extend between the forward ends of said side bars, and mounted to swing upon said cross bar is the traction unit of the device. As most clearly shown in Figures 3 and 4, this traction unit includes spaced parallel air cylinders 13 closed at their upper ends by heads 14 and rising from said heads are stems 15 provided at their upper terminals with sleeves 16 accommodating the cross bar therethrough. Closing the cylinders at their lower ends are heads 17 and slidable in the cylinders are pistons 18 from which extend piston rods 19 received through suitable glands upon the heads. At their outer ends the piston rods formed with ball terminals 20 and surrounding said rods to bear between the pistons and the heads 17 of the cylinders are springs 21 normally holding the pistons retracted.

Connected with the outer ends of the piston rods 19 is a longitudinally curved bearing block 22 to the upper side of which are secured sockets 23 accommodating the ball heads 20 of said rods connecting the block with the rods. As best brought out in Figure 4, the block is recessed to accommodate traction wheels 24 and extending transversely through the block are shafts 25 to which said wheels are fixed. At a point midway between the wheels 24 the block is provided with a recess 26 opening through the upper face of the block and fitting in said recess is an appropriate electric motor 27 removably secured in the recess by a filler block 28 fitting in said recess to overlie the motor. The block 28 is attached to the block 22 by suitable cap bolts which may be adjusted by tightly clamping the motor in position. The drive shaft of the motor is indicated at 29 and fixed upon said shaft are companion sprockets 30. Extending rearwardly from the block at opposite sides of the shaft 29 are parallel stub shafts 31 upon which are journaled sprockets 32 carrying pinions 33 and fixed to the rear ends of the axle shafts 25 of the traction wheels are beveled gears 34 meshing with said pinions. Trained around the sprockets 30 and 32 are sprocket chains 35 so that, as will be seen, the ground wheels will be driven in unison by the motor. Secured to the rear side of the bearing block 22 is a cover 36 housing the gearing associated with the motor and ground wheels and mounted at the ends of said cover are catches 37.

Extending between the heads 14 of the cylinders 13 is a pipe 38 spacing the cylinders with respect to each other and connected to said pipe is a flexible hose 39 leading to a control valve at the dash 40 of the vehicle or other point convenient to the driver. As shown in detail in Figures 7 and 8, the valve includes a casing which is formed of mating annular plates 41 and 42, the former of which is provided with a flange 43 surrounding the latter of said plates and extending through said flange are suitable fastening devices connecting the plates. The plates are formed with spaced ports 44 and 45 and rotatably confined between the plates is a valve disc 46 having a port 47 adapted to be brought into register with said first mentioned ports respectively. Fixed to the valve disc centrally thereof is a stem 48 extending through the dash 40 and provided at its outer end with a preferably knurled head 49 which may be grasped for manually rotating the valve disc. Connecting the hose 39 with one end of the port 44 of the valve casing is a T 50 and leading from said T is a branch pipe 51 threaded into one end of the port 45 while from the opposite end of the latter port extends an exhaust pipe 52. Mounted at some convenient point upon the vehicle is, as shown in Figure 2, a compressed air supply tank 53 which may be supplied with air by any suitable pump driven by the vehicle motor and leading from said tank is a pipe 54 connected to the end of the port 44 of the valve opposite the T 50. Thus, by turning the valve disc 46 until the port 47 threeof is brought into register with the port 44, the port 45 will be closed while air will be admitted from the supply tank 53 to the cylinders 13 for forcing the pistons 18 downwardly and, as shown in Figure 1, elevating the front wheels of the vehicle clear of the ground. On the other hand, by turning the valve disc in the opposite direction until the port 47 thereof is brought into register with the port 45 of the valve casing, the port 44 will be closed while air will be permitted to exhaust from the cylinders through the pipes 51 and 52 for lowering the forward end of the vehicle.

Leading from the motor 27 of the traction unit of the device is an electric cable 55 connected with a switch upon the dash 40 of the vehicle or other point thereon convenient to the driver. As shown in Figures 9 and 10, this switch includes a base plate 56 of suitable insulating material and extending between the ends of the plate and the dash are brackets 57 mounting the switch. Upstanding from the base plate medially thereof are spaced posts 58 and mounted to rock upon said posts are companion switch blades having angularly disposed portions 59 and 60 respectively. Upstanding from the base plate near one end thereof are spaced contacts 61 to cooperate with the portions 59 of the switch blades and upstanding from the base plate near its opposite end are similar contacts 62 to cooperate with the portions 60 of the switch blades. Mounted between the switch blades is a block 63 of suitable insulating material connected with the blades by cap screws extending through the blades, and rising from said block medially thereof is a switch lever 64 extending freely through a suitable slot in the dash and operable for rocking the switch blades. Connected to the contacts 61 of the switch are feed wires 65 leading from a battery or other suitable source of electrical energy upon the vehicle. Extending diagonally between the contacts 61 and 62 are wires 66 and leading from the posts 58 are the circuit wires 67 of the cable 55. Thus, after the forward end of the vehicle has been elevated, as previously described, the lever 64 of the switch may be rocked to engage the portions 59 of the switch blades with the contacts 61 for driving the motor in one direction, or may be rocked to engage the portions 60 of the switch blades with the contacts 62 for driving the motor in the opposite direction. Accordingly, the traction wheels 24 may be caused to turn in either one direction or the other for swinging the forward end of the vehicle in either direction desired. Mounted upon the forward end portions of the side bars 10 of the chassis frame are, as shown in detail in Figure 6, inwardly directed overhanging brackets 68 to the inner ends of which are attached depending cushioning springs 69 and pivoted upon said brackets are depending catches 70 limited in their movement by stop rods 71 extending through suitable slots in the catches. Bearing between the free ends of the catches and the side bars 10 are springs 72 and connected to said catches are cables 73 extending through the springs and through the side bars around pulleys 74. From the pulleys 74 the cables extend back through the side bars beneath pulleys 75 at the inner sides of the bars and are connected to a cable 76 extending rearwardly within the side bar at the left of the vehicle. Mounted upon said side bar is a bracket 77 and pivoted upon said bracket is a lever 78 to which the cable 76 is connected, said lever being provided with a foot pedal 79 so that the lever may be rocked for retracting the catches 70 simultaneously. Mounted upon the dash of the vehicle is, as shown in Figure 2, a post 80 and slidable through said post is a hand rod 81 extending freely through the dash. Attached to said rod is a spring 82 normally holding the handle of the rod seated against the post and extending between the rod and the casing 36 of the traction unit is a cable 83 trained around suitably located pulleys so that by pulling rearwardly upon the hand rod 81 the traction unit may be swung upwardly to inactive position. When so swung upwardly, the springs 69 will, as shown in Figure 6, serve to cushion said unit in its upwardly movement while the catches 37 of the unit will engage with the catches 70, which latter catches will then function to support the traction unit inactive. Extending between the side bars 10 of the chassis frame above and slightly in the rear of the front axle 11, is a cross bar 84, and mounted to swing on said bar are spaced latches 85. Extending between said latches is a cross rod 86 and connected to said rod is a spring 87 tending to swing the latches rearwardly and upwardly away from the axle. Extending between said cross rod and the casing 36 of the traction unit are spaced cables 88 connecting the latches with said unit. Thus, assuming the traction unit to be in its elevated inactive position supported by the catches 70, it will be seen that when the pedal 79 is actuated for rocking the lever 78 and retracting the catches 70, the traction unit will be freed, when, of course, said unit will swing downwardly to active position. When this occurs, the latches 85 will be swung downwardly and forwardly by the cables 88 to engage beneath the axle 11 when said latches will provide a rigid coupling between the axle and the side bars 10 of the chassis frame. Accordingly, when the pistons 18 are then forced downwardly for elevating the forward end of the vehicle, the lift upon the side bars 10 will be communicated directly to the front axle of the vehicle for elevating said axle and consequently lifting the front wheels of the vehicle clear of the ground. When the traction unit is then subsequently returned to its inactive position, the spring 87 will, of course, retract the latches 85 out of engagement with the axle. It will accordingly be seen that I provide a mechanism which may be readily operated from the driver's seat of the vehicle for lifting the front end of the vehicle and swinging the vehicle in either one direction or the other, as may be desired, after which the front end of the vehicle may be lowered and the mechanism disposed in inactive position out of the way so that the vehicle may be operated in the usual manner.

Having thus described the invention, what is claimed as new is:

1. The combination with a motor vehicle, of a traction unit pivotally connected with the forward end portion of the vehicle frame to swing downwardly to vertical position therebeneath and including traction wheels, means for shifting said wheels into engagement with the ground and elevating the forward end portion of the vehicle, means for turning said wheels, and means associated with the traction unit and movable to extend between the frame and the front axle of the vehicle rigidly coupling the frame therewith.

2. The combination with a motor vehicle, of a traction unit pivotally connected with the forward end portion of the vehicle frame to swing downwardly to vertical position therebeneath and including traction wheels, means for shifting said wheels into engagement with the ground and elevating the forward end portion of the vehicle, means for turning the wheels, means associated with the traction unit to extend between the frame and the front axle of the vehicle rigidly coupling the frame therewith, and an operative connection between the traction unit and said last mentioned means whereby when the traction unit is swung downwardly such means will be moved into engagement with the axle.

3. The combination with a motor vehicle, of a traction unit pivotally connected to the forward end portion of the vehicle to swing downwardly to vertical position therebeneath and including traction wheels, means for shifting said wheels into engagement with the ground and elevating the forward end portion of the vehicle, power means for rotating the wheels, a pivoted latch connected with the vehicle frame, and an operative connection between said latch and the traction unit whereby when the traction unit is swung downwardly the latch will be moved into engagement with the front axle of the vehicle forming a rigid connection between the frame and said axle.

4. The combination with a motor vehicle, of a traction unit pivotally connected to the forward end portion of the vehicle to swing downwardly to vertical position therebeneath and including traction wheels, means for shifting said wheels into engagement with the ground and elevating the forward end portion of the vehicle, means for rotating the wheels, means for swinging said unit upwardly to inactive position, spring actuated catch members upon the vehicle, catch members upon said unit engageable with said first mentioned catch members for holding the unit in inactive position, and foot operated means for retracting said first mentioned catch members and freeing the unit for downward movement.

5. The combination with a motor vehicle, of a traction unit pivotally connected to the forward end portion of the vehicle to swing downwardly therebeneath and including traction wheels, means for shifting said wheels into engagement with the ground and elevating the forward end portion of the vehicle, power means for rotating the wheels, a swingingly mounted latch carried by the vehicle frame, a cable connecting said latch with said unit whereby when the unit is swung downwardly the latch will be moved into engagement with the front axle of the vehicle forming a rigid connection between the frame and said axle, a cable connected with said unit and operable for swinging the unit upwardly to inactive position, and means for disengaging the latch from the axle when the unit is swung upwardly.

In testimony whereof I affix my signature.

HAROLD H. COLLINS. [L. S.]